June 9, 1942.  J. L. RODGERS, JR., ET AL  2,285,614
COMPOSITE STRUCTURE
Filed July 28, 1938
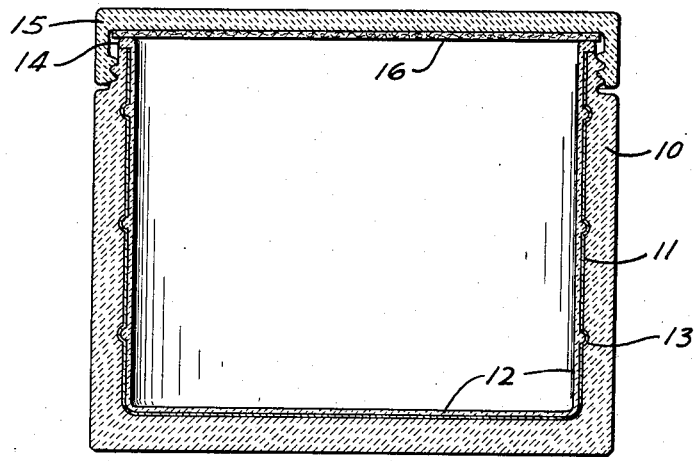
Fig. I
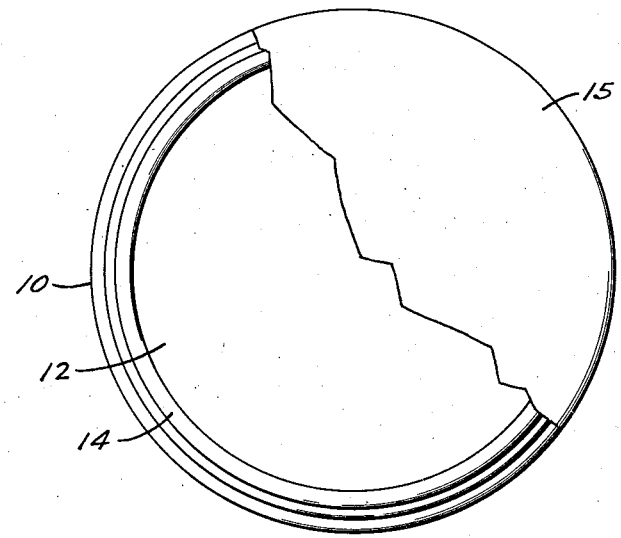
Fig. II
James L. Rodgers Jr.
Charles E. Slaughter
INVENTORS
BY Marshall & Marshall
ATTORNEYS Patented June 9, 1942

2,285,614

UNITED STATES PATENT OFFICE 2,285,614

COMPOSITE STRUCTURE

James L. Rodgers, Jr., New York, N. Y., and Charles E. Slaughter, New Canaan, Conn., assignors to Plaskon Company, Incorporated, Toledo, Ohio, a corporation of Delaware Application July 28, 1938, Serial No. 221,758

1 Claim. (Cl. 215—12)

The invention relates to composite structures made of synthetic resins or plastics, and its principal object is to provide a composite structure having valuable properties that cannot be obtained by use of any one of the structural materials alone.

More specific objects and advantages are apparent from the description, in which reference is had to the accompanying drawing illustrating a preferred embodiment of the invention.

Fig. I is a vertical section of a composite container constructed in accordance with the invention.

Fig. II is a plan thereof, with a portion of the cover broken away.

This specific drawing and the specific description that follows merely disclose and illustrate the invention, and are not intended to impose limitations upon the claim.

In the manufacture of a composite structure in accordance with the invention, an outer body of formaldehyde-urea resin is first formed by casting or pressing in a mold at an elevated temperature. Formaldehyde-urea resin is of the thermosetting type, so that a body of the resin which has once been fused in a mold is infusible. The resin is also superior to other plastics in that it is insoluble in organic solvents and is highly resistant to light. However, a formaldehyde-urea resin suffers slight surface deterioration upon exposure to water, so that formaldehyde-urea resin is not widely used for cosmetic jars that are to be filled with face creams having a water base. Yet formaldehyde-urea resin is a highly desirable material for toilet articles and jars, because of the fact that it can be used to make pure white or delicately tinted articles.

In accordance with the invention, therefore, a composite structure such as a cosmetic jar is made from an outer body of formaldehyde-urea resin, and an inner shell of a water-resistant thermoplastic resin, such as a resin of the polystyrene or vinyl type. In order to afford full protection against the permeation of moisture to the formaldehyde-urea resin, a liner of metal foil, such as aluminum or tin foil, may be employed between the body of formaldehyde-urea resin and the inner shell of thermoplastic resin. The liner of metal foil can be applied inside the body portion, and the thermoplastic inner shell can be cast in place at an elevated temperature. The infusible formaldehyde-urea resin is protected by the metal foil and is not affected by the elevated temperature. Preferably, the inner shell of thermoplastic resin is injection-molded into place.

In the jar shown in the drawing an outer body 10 of formaldehyde-urea resin is externally threaded adjacent its upper edge and is provided with a liner 11 of metal foil and a thin inner shell 12 of a water-resistant thermoplastic resin. On the inner wall of the body 10 are undercuts 13 into which the thermoplastic resin flows when the inner shell 12 is molded into place. It should be noted that the inner shell 12 is provided with a bead 14 against which the internally threaded cover 15 bears. The cover 15 is provided with the usual paper liner 16, and may be formed of formaldehyde-urea resin or any other desired material.

Various embodiments of the invention may be devised to meet various requirements.

Having described our invention, we claim:

A composite container comprising an outer body of formaldehyde-urea resin having an undercut recess in its inner wall, a liner of metal foil, and an inner shell of a water-resistant thermoplastic resin formed into place, the material of said inner shell extending into such undercut recess in the wall of said outer body.

JAMES L. RODGERS, Jr.
CHARLES E. SLAUGHTER.